(12) United States Patent
Stickel et al.

(10) Patent No.: US 11,038,237 B2
(45) Date of Patent: Jun. 15, 2021

(54) BATTERY PACK AND ELECTRIC HAND TOOL

(71) Applicant: Metabowerke GmbH, Nuertingen (DE)

(72) Inventors: Wolfgang Stickel, Beuren (DE);
Michael Stoll, Wendlingen (DE);
Alexander Wolf, Wendlingen (DE)

(73) Assignee: Metabowerke GmbH, Nuertingen (DE)

( * ) Notice: Subject to any disclaimer, the term of this patent is extended or adjusted under 35 U.S.C. 154(b) by 96 days.

(21) Appl. No.: 16/284,386

(22) Filed: Feb. 25, 2019

(65) Prior Publication Data

US 2019/0296280 A1 Sep. 26, 2019

(30) Foreign Application Priority Data

Feb. 26, 2018 (DE) ...................... 10 2018 104 339.2

(51) Int. Cl.
| | |
|---|---|
| *H01M 50/213* | (2021.01) |
| *H01M 10/613* | (2014.01) |
| *H01M 10/6235* | (2014.01) |
| *H01M 10/643* | (2014.01) |
| *H01M 10/42* | (2006.01) |
| *H01M 10/6566* | (2014.01) |
| *H01M 50/20* | (2021.01) |
| *H01M 50/30* | (2021.01) |
| *H01M 50/502* | (2021.01) |

(52) U.S. Cl.
CPC ....... *H01M 50/213* (2021.01); *H01M 10/425* (2013.01); *H01M 10/613* (2015.04); *H01M 10/6235* (2015.04); *H01M 10/643* (2015.04); *H01M 10/6566* (2015.04); *H01M 50/20* (2021.01); *H01M 50/30* (2021.01); *H01M 50/502* (2021.01); *H01M 2010/4271* (2013.01); *H01M 2220/30* (2013.01)

(58) Field of Classification Search
None
See application file for complete search history.

(56) References Cited

U.S. PATENT DOCUMENTS

2008/0272760 A1* 11/2008 Wiesner ................ H02J 7/0063
323/318
2014/0349143 A1* 11/2014 Ogura ............... H01M 10/6556
429/7

FOREIGN PATENT DOCUMENTS

| DE | 9404070 U1 | 5/1994 |
|---|---|---|
| DE | 29515860 U1 | 1/1996 |
| DE | 212012000235 U1 | 9/2014 |
| DE | 102017107868 A1 | 10/2018 |

(Continued)

*Primary Examiner* — Daniel S Gatewood
(74) *Attorney, Agent, or Firm* — Neugeboren O'Dowd PC (57) ABSTRACT

The invention relates to a rechargeable battery pack, in particular for a hand-held electrical power tool, comprising: at least two rechargeable battery cells and/or rechargeable battery cell blocks, which are connected in series or in parallel, a housing with a cell carrier for receiving the rechargeable battery cells and/or rechargeable battery cell blocks in rows arranged one above the other, and a printed circuit board, wherein the rechargeable battery cells are connected to the printed circuit board via conductor plates when the rechargeable battery packs are in the installed state, and wherein at least one of the conductor plates at least partially surrounds at least two conductor plate layers when the rechargeable battery pack is in the assembled state with the printed circuit board.

8 Claims, 6 Drawing Sheets

(56) References Cited

FOREIGN PATENT DOCUMENTS

| EP | 1780825 A1 | 10/2006 |
| EP | 1952518 A1 | 8/2008 |
| EP | 3051608 A1 | 8/2016 |
| EP | 1927147 B1 | 12/2016 |
| WO | 2007059784 A1 | 5/2007 |

\* cited by examiner

BATTERY PACK AND ELECTRIC HAND TOOL

CLAIM OF PRIORITY UNDER 35 U.S.C. § 119

The present Application for Patent claims priority to German Patent Application No. 10 2018 104 339.2 entitled "Rechargeable Battery Pack and Hand-Held Electrical Power Tool as well as a Production Method" filed Feb. 26, 2018, and assigned to the assignee hereof and hereby expressly incorporated by reference herein.

FIELD

The present invention relates to a rechargeable battery pack, in particular for a hand-held electrical power tool, comprising at least one rechargeable battery cell and/or one rechargeable battery cell block, a housing for receiving the at least one rechargeable battery cell, and a printed circuit board that can be connected to the at least one rechargeable battery cell as well as electronic components.

The use of rechargeable battery packs for the operation of hand-held electrical power tools has become increasingly important in practice in recent years. One major advantage of this type of battery-operated hand-held electrical power tool is the greater flexibility while working and in particular the independence from available power sources. Thus by using battery packs, it is also possible in particular to perform outdoor work without being limited by the matter of an available power source. Typically, rechargeable battery packs comprise multiple battery cells, such as three, four, six or eight battery cells, which are accommodated in the housing of the battery pack and which are rechargeable. The housing of the battery pack serves to accommodate the battery cells, but also to detachably connect to the hand-held electrical power tool. Accordingly, the hand-held electrical power tool usually has an interface for mechanically and electrically connecting a battery pack to the hand-held electrical power tool.

BACKGROUND

One great advantage of battery packs that can be cooled by cool air from the environment (air-cooled battery packs) lies in the better power output of the battery packs during operation. Advantageously, overheating of the battery packs is regularly prevented in this way. The service life of the battery cells is thereby significantly increased. An air-cooled rechargeable battery pack of this type is known from EP 1 952 518 A1, for example. Further reference is made to DE 21 2012 000 235 U1 and WO 2007/059784 A1, which likewise describe air-cooled battery packs.

In air-cooled battery packs such as these, it has proven to be disadvantageous in practice that, specifically during machining with cutting tools, the ambient air often contains metallic dust and contaminant particles that can infiltrate into the housing interior through the ventilation recesses and accumulate in the vicinity of the poles of the battery cells. After some time, such accumulations in the interior of the battery pack can result in short circuits, for instance, between the rechargeable battery cells or in the transitional area to other metallic components in the interior of the battery pack. The same applies for water and/or humidity infiltrating through the ventilation recesses, which can also lead to corrosion.

In practice, it has generally been shown to be advantageous for the battery cells of a rechargeable battery pack to be spaced apart from each other in order to reduce the risk of short circuits. Reference is made in this regard to EP 1 927 147 B1 and DE 10 2017 107 868 A1, among others.

Moreover, accommodating the battery cells of a battery pack in a housing that is sealed off from the outside in order to protect them from infiltrating water and dust is known from the prior art. For instance, document EP 3 051 608 A1 discloses a solution for a rechargeable battery unit with an outwardly sealed battery housing. However, a disadvantage of this solution is that the battery cells in the interior of the sealed battery housing are not air-cooled and accordingly can overheat quickly. Battery packs without air cooling have a poorer power output and shorter working life.

SUMMARY

As a rule, the individual battery cells and/or the individual battery cell blocks can be connected in series. At times, so-called conductor plates (also known as conductor lugs) are used, which connect the respective complementary poles of a battery cell to each other.

This type of configuration for a battery is known from DE 94 04 070.2, for example, which describes a battery set, in which individual batteries are arranged in battery-receiving cells, wherein conductor plates are used that serve to connect the individual batteries together and in series. Here, the conductor plates are arranged in a curved manner according to the description.

Furthermore, connecting the individual battery cells with electronics for the purpose of monitoring their cells is known in lithium ion batteries in which the charge level and the charging process are supposed to be monitored by the electronics of the battery pack. To this end, stranded wires, for example, which connect the battery cells to the electronics unit and, here in particular, to the printed circuit board can be provided in the prior art.

In this context, a component of the battery pack that is important in practice is a fuse, which is usually provided at the interface between the printed circuit board and the at least one rechargeable battery cell, in particular the serially connected rechargeable battery cells, to protect the printed circuit board from short circuits and overcurrent. For this purpose, fuses are usually installed as purchased parts that have a conductive core element, through which the desired electrical connection is created and which blows out or ruptures in an undesirable load condition, as well as a housing that encompasses this core element to protect said core element from external influences and to protect the surrounding components from any fragmenting pieces in the event of a blow-out or rupture of the conductive core element. One disadvantage of the known fuses used in this instance is the relatively high cost of the purchased parts.

A further important component of the battery pack in this context is the charge indicator that battery packs can have. With a charge indicator such as this, the user can check the current charge level of the battery pack. A charge indicator is described in DE 29515860 U1, for example. In newer battery packs, this kind of charge indicator is integrated directly into the battery pack and displays whether the battery pack is fully charged, partially charged or completely charged by means, for instance, of lighting elements that can be activated independently of one another. A user can also query the current charge level by pressing a mechanical switch, i.e. the lighting elements as optical indicators for the charge level of the battery pack are activated for a predetermined period of time only upon request in order to save energy.

For an especially simple implementation, the lighting elements can be provided directly on the printed circuit board, and the housing can have recesses through which the status of the lighting elements (active, i.e. illuminated, or not) is visible to the user from outside. In an implementation such as this, however, air and particles carried with it can infiltrate into the housing interior from the outside through the viewing recesses, which entails the known disadvantages.

A problem addressed by the present invention consists in reducing the disadvantages of air-cooled battery packs known from the prior art and to provide an improved battery pack.

As a solution to this problem, the present invention proposes a battery pack having the features of claim 1 and a hand-held electrical power tool having the features of claim 10.

Accordingly, a rechargeable battery pack, in particular for a hand-held electrical power tool, is proposed which comprises: at least one rechargeable battery cell and/or one rechargeable battery cell block, a housing for receiving the at least one rechargeable battery cell and/or the at least one rechargeable battery cell block, and a printed circuit board that can be connected to the at least one rechargeable battery cell as well as electronic components, wherein the housing has ventilation recesses, by means of which cooling air from the environment can reach the housing interior and can be dissipated back into the environment. According to the invention, a structure for conducting air and separating the pole areas of the battery cells can be provided in the interior of the housing.

Because the airflow in the interior of the battery pack housing runs along a separation line that separates the pole areas of the battery cells, such as long a central longitudinal axis of the battery pack, a bridging by accumulated metal particles that is known from practice is significantly impeded, and the risk that short circuits will occur is reduced.

The ventilation recesses in the housing aid in the exchange of air with the environment. The environment in this context can be both the ambient air and a stream of cooling air produced by an attached electric tool device and is conducted into the housing interior of the battery pack through at least some of the ventilation recesses. Similarly, when the battery pack is accommodated in a corresponding charger, at least some of the ventilation recesses can also be used as air inlets for a stream of cooling air produced by the charger.

The battery cell can be configured to be substantially cylindrical, wherein the term "cylindrical" is not limited to circular cylindrical cross-sections, but is also formed in the mathematical sense by any type of base area that is moved along a prescribed curve. According to the mathematical definition, the cylindrical shape includes a lateral surface and two end faces. In the case of the battery cell, the poles of the battery cell are arranged in the vicinity of the end faces, and they respectively form the resulting pole areas of the battery pack.

According to a development, it is possible that the battery pack has an electronics cup that is capable of accommodating at least some of the electronic components of the printed circuit board and especially contributes to providing airflow and separating the pole areas of the battery cells.

In particular, the electronics cup has, on a surface facing away from the electronic components it is accommodating, at least one air-conducting element, especially a partition, for providing airflow and separating the pole areas of the battery cells.

It is additionally possible that the housing comprises at least one housing part that can be detached from the rest of the housing, in particular the housing cover, wherein said housing cover can have on an inner surface at least one air-conducting element, in particular a partition, that provides airflow and separating the pole areas of the battery cells and that can interact with the partition of the electronics cup and, jointly with it, forms a dividing wall in the interior of the battery pack.

Furthermore, the electronics cup can be made of a synthetic material and in particular be cast in order to protect the electronic components accommodated therein from contamination.

The housing part that can be detached from the rest of the housing, in particular two laterally arranged side covers, can also have, at least on its inner side, an injection-molded rubber component for the improved sealing of components of the battery pack that are adjacent when in the installed state, in particular the pole areas.

The housing can additionally have a cell carrier for the mounting of the at least one battery cell in the interior of the housing. The at least one battery cell can be mounted in the cell carrier in such a way that the cooling air in the housing interior can flow around at least some parts of it in the area of its lateral surface. Moreover, it is possible that the at least one battery cell, in the vicinity of its pole-side end section, is mounted in the cell carrier in such a way that the resulting pole areas of the battery pack are accommodated in an air-tight manner within the housing.

A particularity of this embodiment of the invention lies in the fact that the cooling air cannot flow completely around the battery cell, but rather only in the area of its lateral surface. The sensitive poles of the battery cell and therefore the pole areas of the battery pack, at which a short circuit and/or corrosion can occur, are meanwhile accommodated within the housing in an airtight manner, and so neither cooling air nor particles contained within it (dust, metal or water) from the environment or moisture can come into contact with the poles of the at least one battery cell. In this way, short circuits in the vicinity of the poles of the battery cells, such as those that could occur in the past in air-cooled rechargeable battery packs, and corrosion problems can be avoided safely and reliably. At the same time, however, it is ensured that a majority of the generated heat energy can nevertheless be dissipated into the cooling air in the interior of the housing, whereby the risk of the battery pack overheating is reduced.

It is possible in particular that the detachable housing part can be placed on the cell carrier and has, for example, the ventilation recesses and/or a structure for detachably connecting to a hand-held electrical power tool and/or has contact elements for electrically connecting to a hand-held electrical power tool or to a battery charger.

It can further be provided that the battery pack contains a plurality of battery cells and/or battery cell blocks that face each other within the cell carrier and are arranged substantially in parallel and, in the area of their pole-side end sections, are disposed within the cell carrier such that the poles of the battery cells do not touch each other.

By providing a plurality of battery cells that can be connected in series and/or in parallel with one another, the power that the battery pack can dispense can be increased and/or the duration of the power output can be extended. The pole-side end section of the battery cells, which are arranged substantially parallel within the cell carrier, form the two resulting pole areas of the battery pack.

For the sake of simplification, reference will hereafter always be made to an embodiment of a battery pack having multiple battery cells, such as two, three, four, six or eight battery cells. However, the features described in connection with them can naturally also be applied to a battery pack with only one battery cell.

In this instance, it is possible that the battery cells and/or battery cell blocks of the battery pack are connected in series with each other via conductor lugs when in the assembled state.

It may further be provided that the cell carrier has closed side walls with a plurality of bearing sections for supporting the pole-side end sections of the battery cells to be accommodated, the inner circumference of said bearing sections corresponding to the outer circumference of the battery cells to be accommodated at their pole-side end sections.

By definition, the poles are arranged in the vicinity of the end faces of the battery cells. However, the pole-side end sections include not only the end faces but also an adjacent section of the lateral surface of the associated battery cell, wherein this particular section of the lateral surface in the transition area to the end faces is used to support the battery cells. These pole-side end sections of the battery cells have a specific outer contour and a prescribed outer circumference. Accordingly, the bearing sections are configured such that their inner circumference corresponds to the outer circumference of the battery cells to be accommodated at their pole-side end sections. The battery cells can thus be inserted into the bearing sections of the closed side walls of the cell carrier with as little play as possible.

It is also possible that the side walls of the cell carrier are closed and have lateral recesses only in the vicinity of the bearing sections for electrically contacting the poles of the battery cells. As an alternative to this configuration, it is generally also conceivable that the bearing sections themselves have means for electrically contacting the poles of the battery cells. When lateral recesses for electrically contacting the poles of the battery cells are provided in the vicinity of the bearing sections, the otherwise closed side walls of the cell carrier serve to separate the air-swept housing interior from the airtight housing part for receiving the pole areas of the battery pack within the housing.

It is known in practice that the battery cells, e.g. those configured as lithium-ion battery cells, release large amounts of gas through a valve at the positive pole when they overheat. Accordingly, there is a risk that a completely sealed pole area of a battery pack could result in damage to the battery pack when off-gassing one or more cells. To address this possible problem, the cell carrier can have at least one pressure compensation device that permits pressure compensation, in particular with the housing interior and via the ventilation recesses of the housing with the environment, in the event of a predefined level of overpressure at one of the pole areas of the battery pack.

Furthermore, it is possible that a pressure compensation device such as this is formed on each of the side walls of the cell carrier when the side walls of the cell carrier are configured to be closed and are intended to separate the housing interior from the airtight pole areas.

Moreover, it can be provided that the pressure compensation device has a predetermined breaking point, a recess that is covered by a membrane, a sealing part or the like, or a valve. For example, a predetermined breaking point represents an easily produced and cost-effective solution for a pressure compensation device, while a covered recess can at least be repaired in the event that the covering (be it a membrane, a sealing part or the like) is destroyed, but is somewhat more expensive to manufacture. Finally, a valve represents a solution that can be used repeatedly over the entire service life of the battery pack; however, the production assembly of a valve such as this is comparatively cost-intensive.

According to a development of the invention, it is additionally possible that the printed circuit board has a charge indicator, wherein the charge indicator can make information about the charge state of the battery pack visible with the aid of activatable lighting elements, in particular LEDs, and wherein the housing has recesses through which the state of the activatable lighting elements can be recognized. In this variant, an elastic element, which can seal the housing off from the environment in the vicinity of the charge indicator, can be provided between the housing and the printed circuit board in the vicinity of the charge indicator. In this way, too, improved protection against dust and liquid particles (and thus corrosion in the interior of the battery pack) can be achieved.

Additionally, it is possible that the printed circuit board has at least one mechanical switch for activating the charge indicator, said switch protruding through a recess in the housing of the battery pack for manual actuation by a user, and wherein the elastic sealing element especially has a switch dome, which is able to accommodate the mechanical switch in order to reliably seal the housing off from the environment in the vicinity of the mechanical switch.

In this embodiment, the elastic sealing element can thus seal off both the mechanical switch and the recesses for the lighting elements from the environment, which is especially advantageous.

Moreover, the elastic sealing element can be made of rubber, silicone or the like. In one conceivable embodiment, the sealing element can be made in particular of a transparent material, whereby the rays of light emitted by the lighting elements can shine through outwardly.

Alternatively or additionally, the elastic sealing element can have recesses to provide better visibility, through which the state of the activatable lighting elements can be recognized.

Furthermore, it is possible that the housing part that can be detached from the rest of the housing, in particular the housing cover, can pre-tension the elastic sealing element against the printed circuit board at least in some sections. A defined layer of the elastic sealing element can thereby be secured in the installed battery pack in an especially simple way.

In this way, at least in an installed state, it is possible that the housing part that can be detached from the rest of the housing, in particular the housing cover, has an inner housing wall when assembled, which protrudes in the direction of the printed circuit board and can pre-tension the elastic sealing element against the printed circuit board at least in some sections.

In addition, the elastic sealing element can have recesses for a defined arrangement on the printed circuit board. As a result of this measure, as well, the installation is simplified and it is ensured that the elastic sealing element does not slip relative to the printed circuit board until the battery pack is completely installed.

According to a development, it is also possible that the printed circuit board can be connected to the at least one battery cell indirectly via at least one electrically conductive fuse element. In this instance, the housing can have a fuse area that serves to securely accommodate the at least one electrically conductive fuse element and is integrally formed with the housing, wherein the fuse area can at least partially enclose the electrically conductive fuse element when the battery pack is in the assembled state.

One particularity of this embodiment of the invention is thus that, instead of employing an electrical fuse as a separate component that is detached from the other components of the battery pack, in particular in the form of a purchased part, at least the housing of the electrical fuse is formed by a fuse area that is integrally formed with the housing of the battery pack. Just like the housing in electrical fuses, the fuse area here serves to protect the electrically conductive fuse elements from external influences and to protect the surrounding components from any fragmenting pieces in the event of a blow-out or ruptures of the electrically conductive fuse element.

The electrically conductive fuse element can thus be completely accommodated and enclosed in the fuse area in order to prevent the possible accumulation of metal particles or water particles in the cooling air on the fuse element as well as the associated disadvantages. In addition, the surrounding electronic components of the battery pack are protected from any fragmenting pieces of the fuse element if it blows out or ruptures.

Usually, the housing can be originally shaped, especially cast, from a synthetic material such that an integral configuration of the fuse area as a housing for the fuse element can be implemented in a particularly cost-effective manner. The conductive fuse element can, in turn, likewise be very simple to produce by means of an electrically conductive wire or a sheet metal part, and so, on the whole, a solution for an electrical fuse can be provided that is significantly more cost-effective compared to the prior art.

It can further be provided that the fuse area is formed at least partially on the detachable housing part and that, when in the assembled state, it has at least one inner housing wall, which can separate the electrically conductive fuse elements that are accommodated in the fuse area from the adjacent electrical components.

Advantageous in this embodiment of the invention is the fact that easier access to the fuse element in the event of a necessary replacement of said fuse element is achieved by partially forming the fuse area on a housing part that can be detached from the rest of the housing, such as the housing cover. The fuse area thus includes at least one housing wall, which extends inwardly from the housing part into the housing interior and which serves to enclose the fuse element or separate the fuse element from the adjacent electrical components.

The enclosed and/or separated fuse element nevertheless remains electrically connected to the printed circuit board and the at least one battery cell in order to perform its function.

The fuse area can, of course, alternatively or additionally be formed at least partly on the cell carrier for supporting the at least one battery cell in the interior of the housing and can have at least one inner housing wall when in the assembled state that can separate the electrically conductive fuse element accommodated in the fuse area from the adjacent electrical components.

According to one development, it is possible that the fuse area has in particular two inner housing walls that, together with sections of the remaining housing, can enclose the electrically conductive fuse element that is connected to the at least one battery cell and the printed circuit board.

Independently of the concrete provision and formation of a fuse element on the detachable housing part and/or on the cell carrier, it is also possible to provide at least one seal between the detachable housing part and the rest of the housing.

In one conceivable embodiment variant, as was mentioned above, two side covers are provided, each of which is arranged in the vicinity of the poles and/or end faces of the accommodated battery cells and can be detachably connected to the cell carrier that accommodates the battery cells. In this solution, the housing for receiving the battery cells is formed substantially by the cell barrier and the two lateral covers.

It is additionally possible that the seal is provided as a circumferential seal on the one or more (in the case of a plurality) detachable housing part(s). Moreover, the seal can have a tongue-and-groove geometry and/or an elastomeric seal. It can be provided, for example, that a circumferential tongue-and-groove geometry is configured on the cell carrier and on the lateral cover or covers, which tightly seals the associated pole area of the battery pack off from the housing interior. Alternatively, however, a seal such as this can also be configured as an inserted or injection-molded seal consisting of an elastic material, such as sponge rubber, felt, plastic or the like.

Finally, a hand-held electrical power tool is proposed with an electric motor and at least one battery pack, which is detachably connected thereto and has the above features, wherein at least one interface is provided for mechanically and electrically connecting the battery pack to the hand-held electrical power tool.

Further features of the invention are highlighted in the description of the figures and in the claims that follow.

The description of the claims describes a possible embodiment of the present invention in detail, wherein independent features of the invention are also disclosed in combination with one another. However, a person skilled in the art can naturally consider these features separately from one another and combine them into further meaningful sub-combinations, without thereby having to exercise inventive skill.

DETAILED DESCRIPTION

The figures show an embodiment of a battery pack according to the invention for a hand-held electrical power tool, which is generally identified with reference sign 10.

The housing of the battery pack 10 according to the invention is composed of multiple housing parts that form the housing as follows: a cell carrier 12, two side covers 14 (cf. also FIG. 2) that are detachably connected laterally to the cell carrier 12, and at least one housing cover 16 (cf. FIG. 4), which can be detachably placed on the cell carrier 12. For a better presentation of the interior components of the battery pack 10, the two side covers 14 as detachable housing parts are not attached to the cell carrier 12 in FIG. 1.

A particularity over the prior art can be seen in the fact that the cell carrier 12 simultaneously forms a part of the outer surface of the housing with its outer surfaces 102, 104 and 106 (cf. FIGS. 1, 3, 4 and 5A). In this way, the heat dissipation outwardly by the battery pack 10 on the one hand and the expense, installation effort and weight of the battery pack 10 on the other hand are reduced compared to the known solutions.

Figure 1:
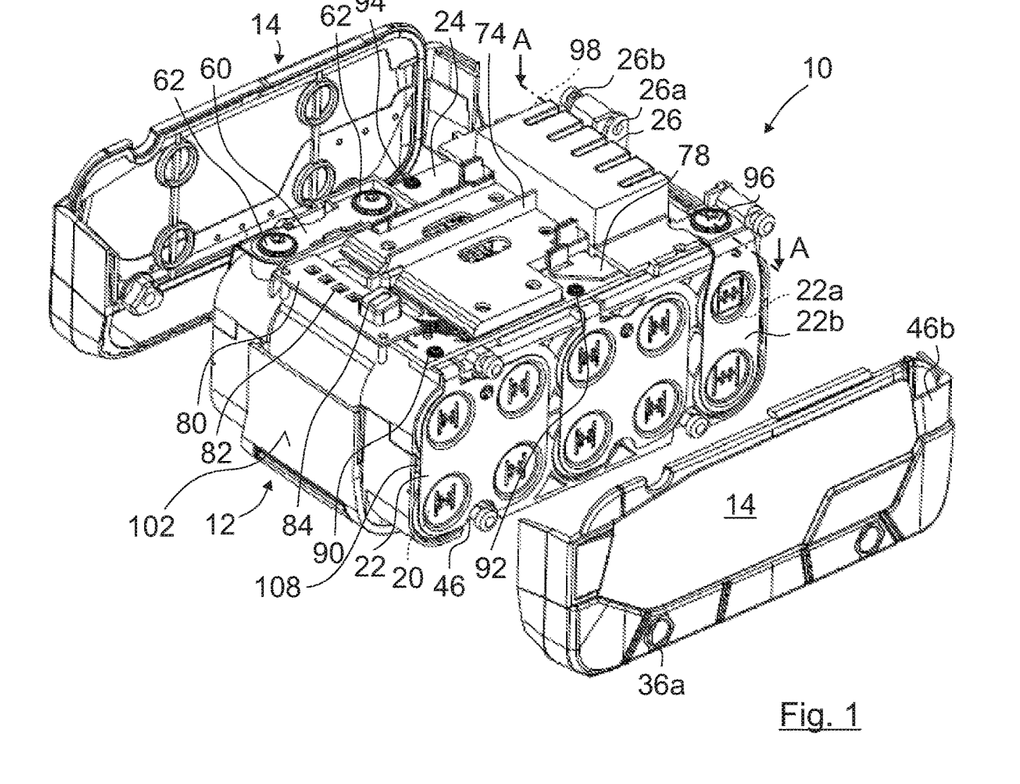
FIG. 1 is an isometric view of an assembled cell carrier of a battery pack according to the invention, with side components in an exploded view.
Figure 3:
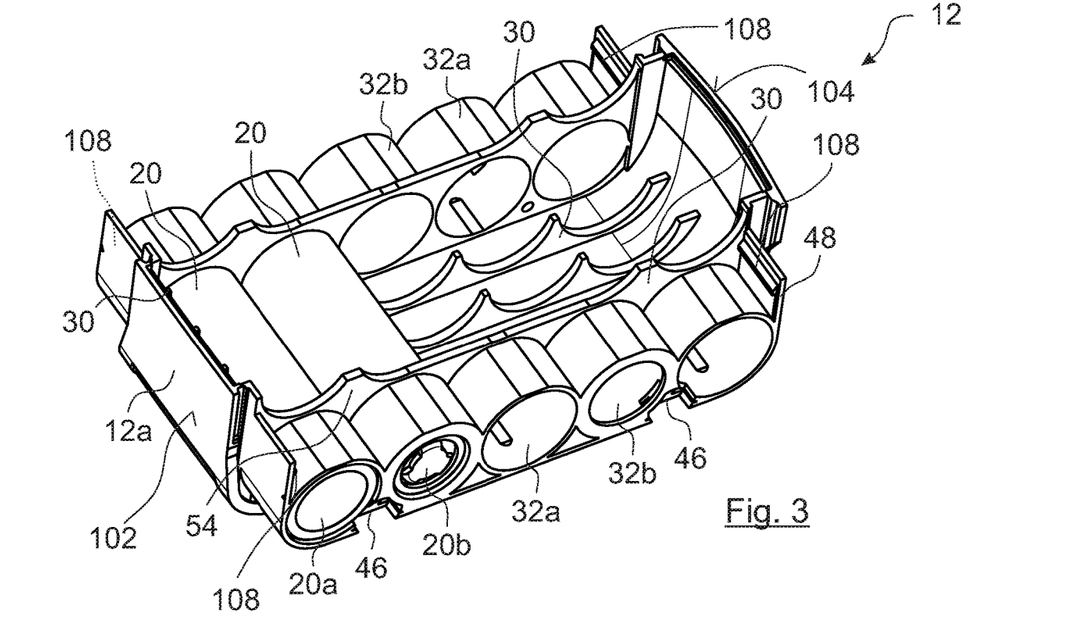
FIG. 3 is a partially assembled cell carrier according to FIG. 1 in an isometric view.

In the embodiment shown, the cell carrier 12 is additionally constructed in two parts and comprises a lower carrier part 12a, which is shown in FIGS. 1, 3, 4, 5A and which is configured to receive a first lower row of battery cells 20 (in the embodiment disclosed here there are five), and an upper carrier part 12b, which is configured to receive a second upper row of battery cells 20 (in the embodiment disclosed here there are five). The two carrier parts 12a, 12b are positively connected to each other by a snap-fit connection 108 (as is indicated in FIG. 1 and is shown in FIG. 3 as a lock-in catch 108 on the lower carrier part 12a).

Figure 4:
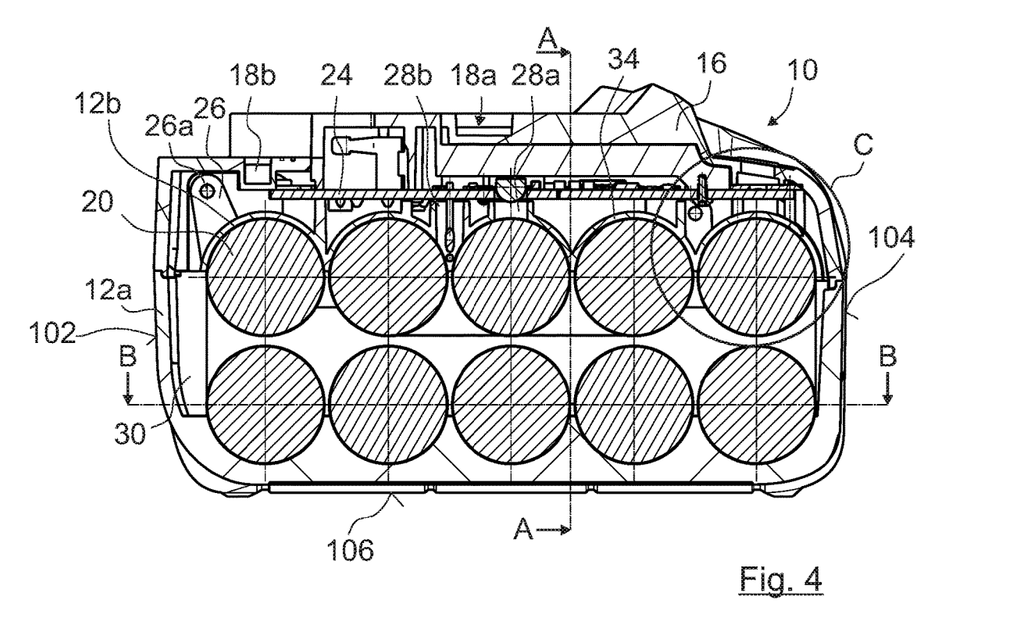
FIG. 4 is a battery pack according to the invention in a longitudinally sectioned view.
Figure 5A:
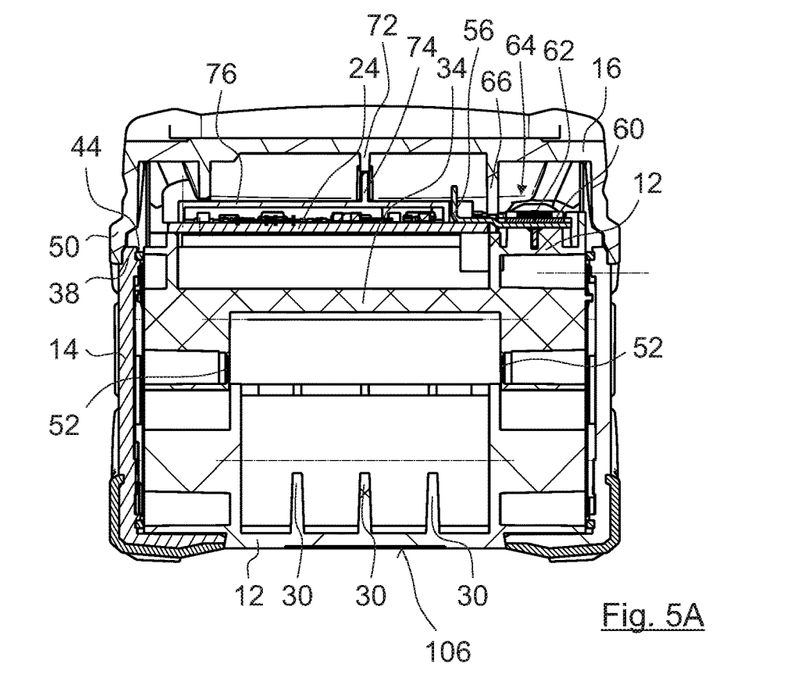
FIG. 5A is a sectional view of the battery pack according to the invention along section line A-A of FIG. 4.
Figure 6:
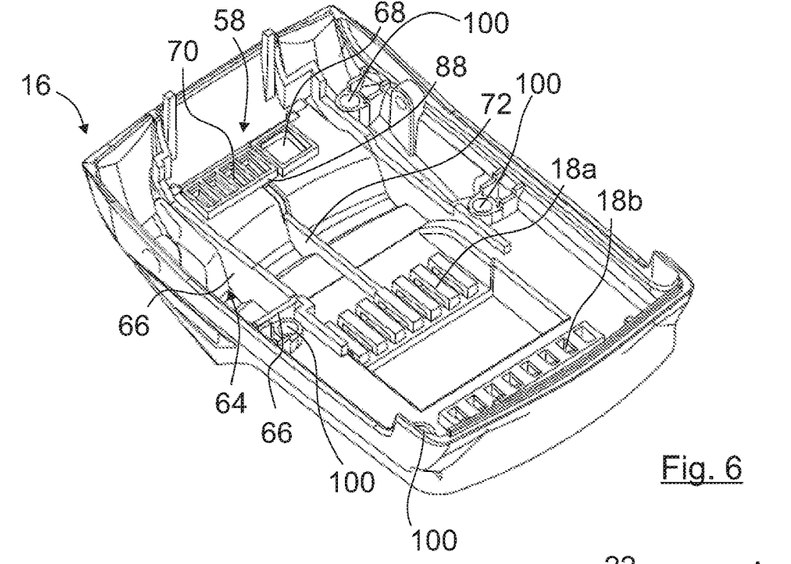
FIG. 6 is a housing cover for the cell carrier and the side components according to FIG. 1 in an isometric view.

The housing cover 16 is shown in particular in FIGS. 4, 5A and 6 and comprises a plurality of ventilation recesses 18a and 18b, by means of which cooling air from the environment of the battery pack 10 can reach the housing interior and can be dissipated back into the environment. The present battery pack 10 is thus a so-called air-cooled battery pack, in which the cooling air can flow around the battery cells 20 accommodated in the housing interior at least in the area of their lateral surfaces.

Figure 9:
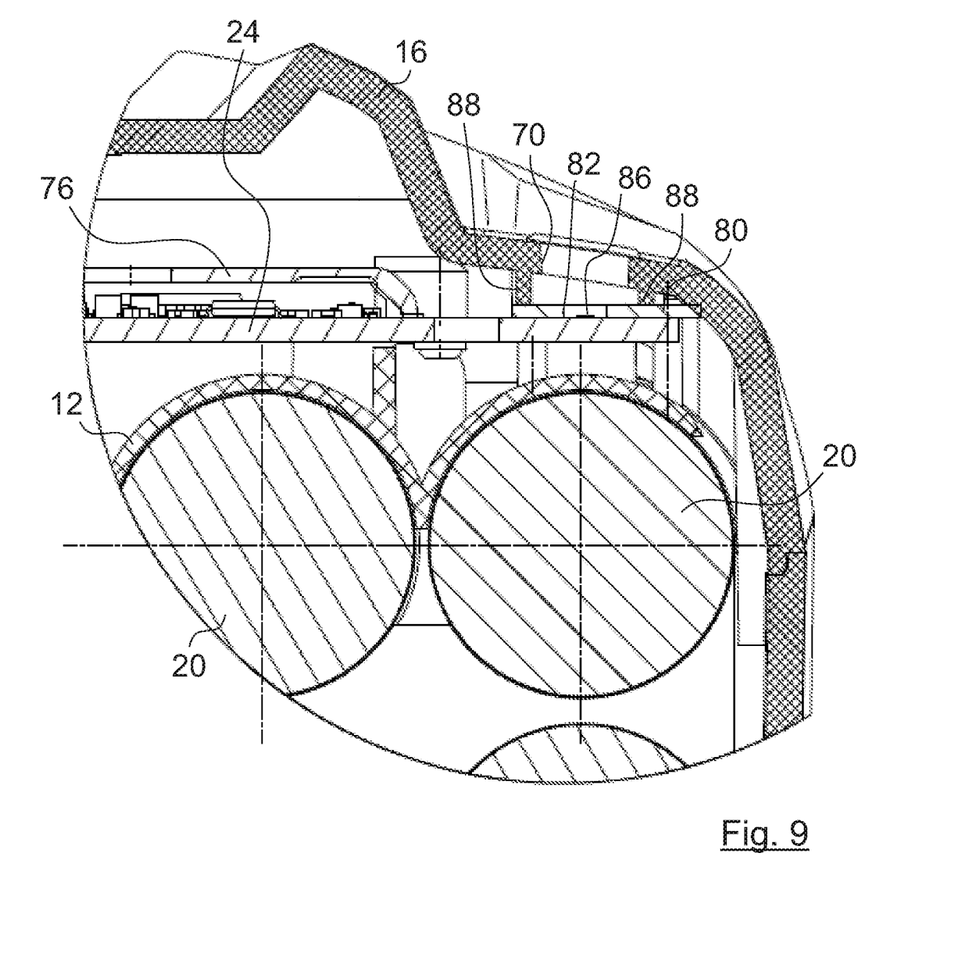
FIG. 9 is a detail view of the battery pack according to the invention corresponding to detail C of FIG. 4.

In the disclosed embodiment, the battery pack 10 according to the invention has ten battery cells 20, which are arranged substantially parallel to one another. The battery cells 20 are electrically contacted via conductor plates 22 in the vicinity of their individual poles 20a and 20b (cf. FIG. 3), wherein the conductor plates 22 are in turn electrically connected to a printed circuit board 24. The printed circuit board 24 can be populated with a row of electronic components, such as a switch or LEDs 86 (cf. FIG. 9), which will not be discussed in greater detail below. As can clearly be discerned in FIG. 1, the printed circuit board 24 is detachably connected to the cell carrier 12 by connection screws 90, 92, 94, 98.

In contrast to the prior art, the conductor plates 22 for individual cell connections in the embodiment variants of a battery pack 10 shown here are attached to the printed circuit board 24 and the cell carrier 12 by screw connections 90, 92, 94, 98. The same applies to the connection of the conductor plate 22 to a negative conductor rail 78 on the printed circuit board 24 and the connection of the conductor plate 22 to an electrical fuse, which likewise occur by means of screw connections 96 and 62 (cf. FIG. 1), whereas they are normally soldered in the prior art.

The advantage over a soldered connection consists in the fact that the risk of a short circuit, especially at small distances between the connection point to a conductor rail, for example (cf. connection screw 92 adjacent to the negative conductor rail 78), can be avoided. Furthermore, the assembly is simplified compared with the prior art, and an exchange of electronics is possible when a malfunction is detected, since screw connections can be detached non-destructively, unlike non-positive connections like soldering.

The first connection screws 90, 92, 94, 98, in particular their head sections, can be accommodated in corresponding depressions 100 on the housing cover 16 and additionally sealed with silicone.

To attach the housing cover 16, the cell carrier 12 also has attachment lugs 26 with threaded recesses 26a, into which corresponding fastening screws 26b (cf. FIG. 1) can be screwed in order to attach the housing cover 16. Moreover, the cell carrier 12 according to the invention has recesses 28a and 28b on its upper side 34 facing the printed circuit board (FIGS. 4 and 5A), which can be used, for instance, to introduce a temperature sensor or the like, starting from the printed circuit board 24.

To ensure that air can circulate around the accommodated battery cells 20 in the housing interior as efficiently as possible, i.e. in particular in the interior of the cell carrier 12, the cell carrier has ventilation ribs 30 (cf. FIG. 3), which both serve to support the lower row of accommodated battery cells and also permit a conducted airflow through the cell carrier 12. An especially efficient circulation around the battery cells 20 in the area of their lateral surfaces in the interior of the cell carrier 12 can also be achieved in that the upper row of the accommodated battery cells is also not completely surrounded by the cell carrier 12 in the area of their lateral surfaces but rather only partially in the area of the upper side 34 of the cell carrier 12 (cf. FIG. 4). Meanwhile, the section of the lateral surfaces of the accommodated battery cells lying opposite the row of battery cells below it is entirely free and unsupported so that the cooling air can circulate unobstructed in this area.

So that the accommodated battery cells 20 are not only arranged parallel to one another in the desired manner but can also be kept at a distance from one another, thereby preventing short circuits (cf. FIGS. 4 and 5B), the cell carrier has bearing sections 32a and 32b, which are provided to support the battery cells 20 in the vicinity of their pole-side end sections. The bearing sections 32a and 32b are dimensioned such that the battery cells are securely mounted in the cell carrier 12 and are accommodated within it with almost no play. Furthermore, a bearing section 32a for a battery cell is open laterally in order to permit the insertion of the battery cell, while the corresponding other bearing section 32b has a bearing shoulder for axial bearing (relative to the longitudinal axis of the battery cell that is accommodated). Naturally, a central recess is additionally provided in the vicinity of the bearing section 32b for the purpose of electrical contacting (cf. FIGS. 3 and 5B).

As has been mentioned, the side covers 14 of the housing of the battery pack 10 are also configured as detachable housing parts. It can be discerned especially well in FIGS. 1 and 2 that the side cover 14 has attachment projections 36, which include bore holes 36a for receiving a screw. The screws 46b (cf. FIG. 1) can be screwed through the screw holes 36a of the attachment projection 36 into corresponding threaded bores 46a in the vicinity of the attachment sections 46 of the cell carrier 12.

Figure 2:
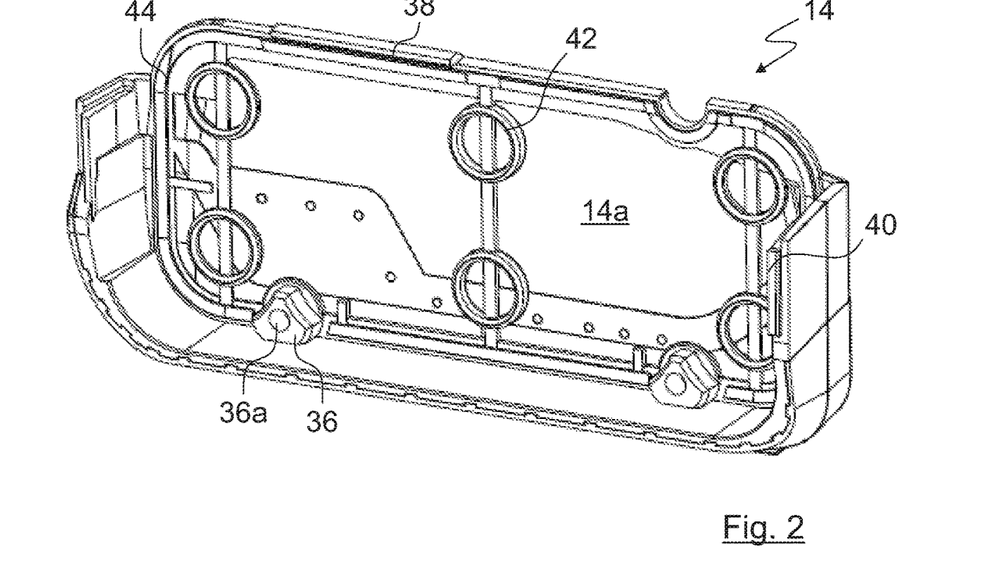
FIG. 2 is a detachable housing part configured as a side cover of the cell carrier according to FIG. 1.

Moreover, the side cover 14 according to FIG. 2 has an upper retaining edge 38 that, when the battery pack 10 is in the assembled state, can be overlapped by a corresponding retaining edge 50 of the housing cover 16 (cf. FIG. 5A) as well as a retaining edge 40 which itself can overlap a corresponding retaining edge 48 (cf. FIG. 3 and FIG. 5B) of the cell carrier 12 when the battery pack 10 is in the assembled state.

Rubber parts 14a that are injection-molded into the cover can additionally be provided on the inner side of the side cover 14 to sealingly receive the pole areas and bearing projections 42, which can serve to supportingly clamp the conductor plates 22.

To further achieve a sealing of the battery pack in the vicinity of the resulting pole areas P1 and P2 (cf. FIG. 5B) of the battery pack 10, the disclosed exemplary embodiment additionally provides a circumferential seal 44 in each case, which can seal off the resulting pole areas P1 and P2 of the battery pack 10 from the environment in an airtight manner when the associated side cover 14 is assembled on the cell carrier 12. This seal 44 can be configured as an elastomeric seal or as tongue-and-groove geometry, for example.

Figure 5B:
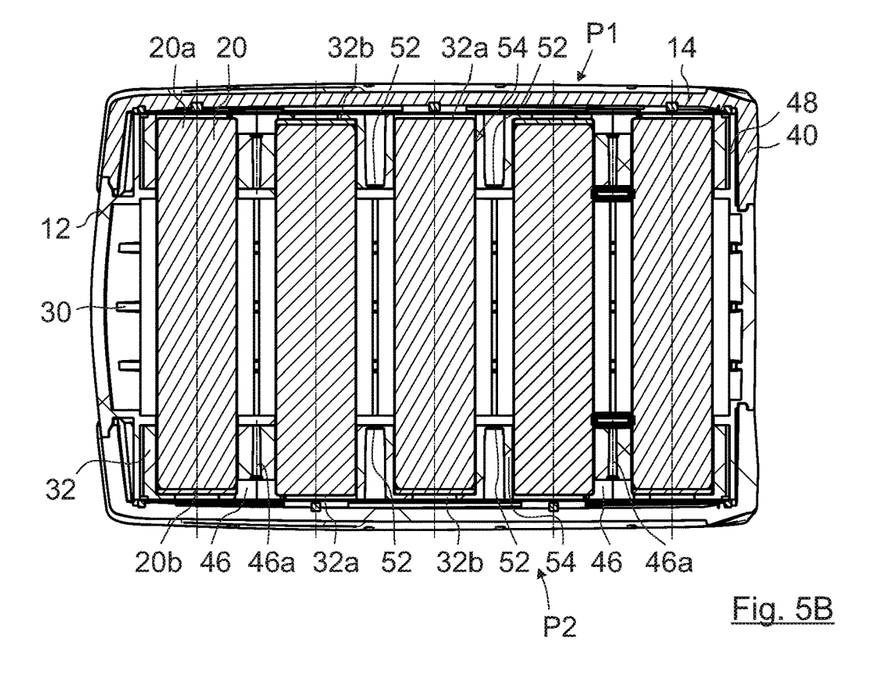
FIG. 5B is a sectional view of the battery pack according to the invention along section line B-B of FIG. 4.

Viewing FIGS. 5A and 5B together additionally shows that the cell carrier 12 has air-tight side walls 54 (with the exception of the bearing sections 32a and 32b with their lateral recesses), which permits a nearly air-tight seal of the pole areas P1 and P2 of the battery pack 10 against the air-swept housing interior. Because the battery cells 20 are accommodated in the bearing sections 32a and 32b almost without play, no exchange of air can take place between the housing interior and the pole areas P1 and P2 through the lateral recesses of the bearing sections 32a, 32b. Furthermore, fastening screws, which impede an exchange of air, are also accommodated in the threaded bores 46a when the battery pack 10 is in the assembled state.

However, in order to ensure that the outgassing of the battery cells remains possible in the event that one or more battery cells overheat in the interior of the battery pack 10 (and in order to thereby avoid potential explosions), predetermined breaking points 52 are provided in the vicinity of the side walls 54 in the disclosed exemplary embodiment, and the reduced wall thickness permits the side wall 54 to rupture in the event of overpressure in one of the pole areas P1 or P2 and thus allows for an exchange of air in the housing interior. An outgassing can then easily occur via the ventilation openings 18a and 18b of the housing, which are provided anyway.

A further advantageous embodiment variant for preventing the accumulation of metal particles in the vicinity of the poles P1 and P2 and especially for preventing bridging and short circuits due to accumulated metal particles is achieved by the formation of a separation of the positive and negative areas in the interior of the battery pack 10. To this end, the housing cover 16 has a partition 72 in the interior that interacts with a corresponding partition 74 on an electronics cup 76 of the battery pack 10 (cf. FIGS. 5A and 6) and together forms a dividing wall in the interior of the battery pack 10.

The electronics cup 76 can be produced by casting in particular can be provided over the electronic components to protect them from contamination and corrosion.

A further measure for improving protection against dust in the interior of the air-cooled battery pack 10 can be seen in the provision of a separately formed elastic sealing element, the molded rubber part 80, in the vicinity of a charge indicator of the battery pack 10.

Conventional charge indicators have a switch applied to the printed circuit board that, when pressed by a user, relays a signal to the printed circuit board so that the LEDs applied to the printed circuit board are or are not illuminated for a prescribed period of time, depending upon the current charge level. Accordingly, recesses 68 for the switch and for the display 70 of the LEDs are provided on the housing, for instance on the housing cover 16, and the LEDs extend through said recesses or at least their illumination state is visible through the recesses. If all LEDs are activated, the battery pack is fully charged; the user recognizes a decreasing charge level of the battery pack as the number of activated LEDs decreases. In practice, owing to the recesses 68, 70 provided in the housing cover, metal particles and especially liquid particles can often disruptively infiltrate into the interior of the battery pack 10 in this region, as well.

To prevent this, the molded rubber part 80 with its LED recesses 82 and its switch dome 84 are placed over the switch and the LEDs 86 of the printed circuit board 24 to seal them, and it creates a reliable seal with the housing cover 16 in the assembled state, wherein the LED display, i.e. the illumination status of the individual LEDs 86, still remains outwardly visible through the recesses 82 of the molded rubber part 80. For example, it can be recognized in FIG. 9 that the housing cover 16 has housing wall sections 88 in its interior which surround the recesses 70 in the charge indicator in the housing cover 16 and reliably press the molded rubber part 80 against the printed circuit board 24 so that the transition area between the housing cover 16 and the printed circuit board 24 in the vicinity of the charge indicator 58 is securely sealed by means of the molded rubber part 80. The same applies to the vicinity of the switch recess 68 in the housing cover 16.

On the whole, the specific design of the housing of the battery cell 10 according to the invention permits the air-cooling of the battery cells contained within it, as a result of which the service life of the battery pack is significantly increased. On the other hand, however, it is ensured that any metallic dust particles and/or air moisture that is swept in cannot penetrate into the vicinity of the poles of the battery cells and thereby cause short circuits and, in particular, damage to the battery pack. In this way, an especially durable and robust battery pack is provided.

A further particularity of the disclosed battery pack 10 can be recognized in the configuration of the electronic fuse. This is not installed in the battery cell as a self-contained purchased part in order to connect the printed circuit board 24 to the battery cells 20, as is common in practice, but instead comprises an electrically conductive fuse element 60, which is enclosed in a fuse area 64 (cf. FIGS. 5A and 6) within the housing of the battery pack 10. The fuse element 60 is formed from a simple metal punched part and is connected by connection screws 62 to a connecting rail 56 of the printed circuit board 24 and/or to a conductor plate 22 of the battery pack 10. In the assembled state of the housing cover 16, the outer housing walls and inner housing walls 66 of the fuse area 64 surround the fuse element 60 in such a way that it (fixed to the cell carrier 12 by the connection screws 62) is enclosed in an inner housing, the fuse area 64, and is thereby protected from infiltrating metal dust and moisture. At the same time, the surrounding electronic components are also protected by the fuse area 64 from fragmenting metal pieces of the fuse element 60 if it blows out or ruptures in the event of an overload.

Figure 7:
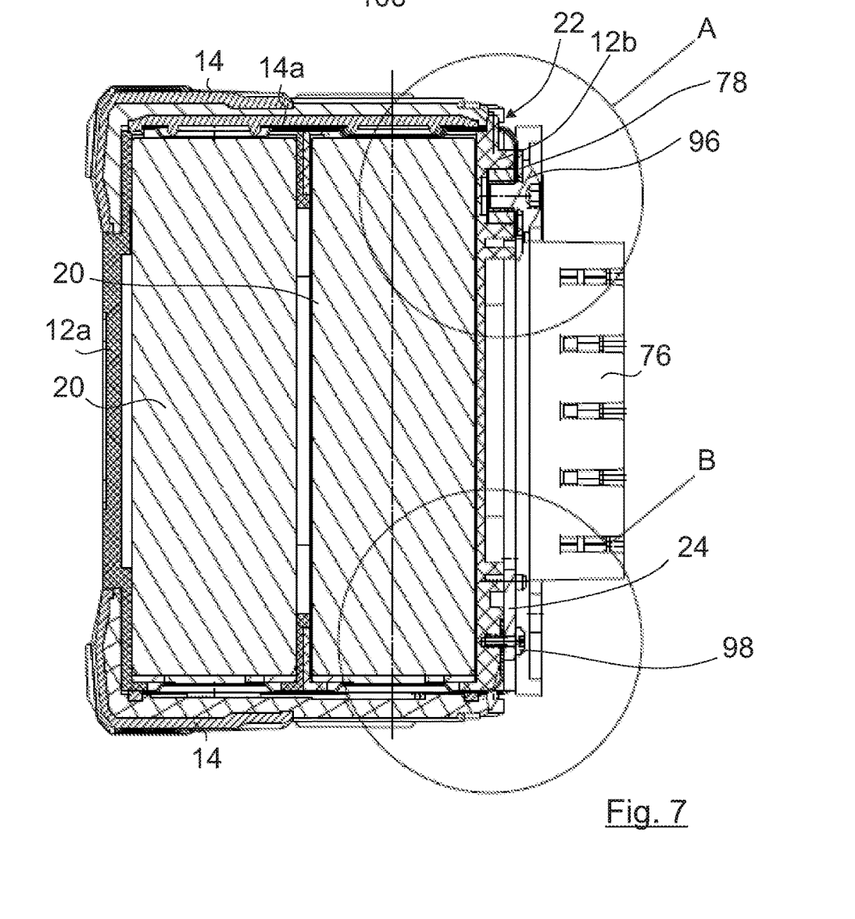
FIG. 7 is a cross-sectional view of the cell carrier with assembled side components, rotated by 90° along section line A-A of FIG. 1.
Figure 8A:
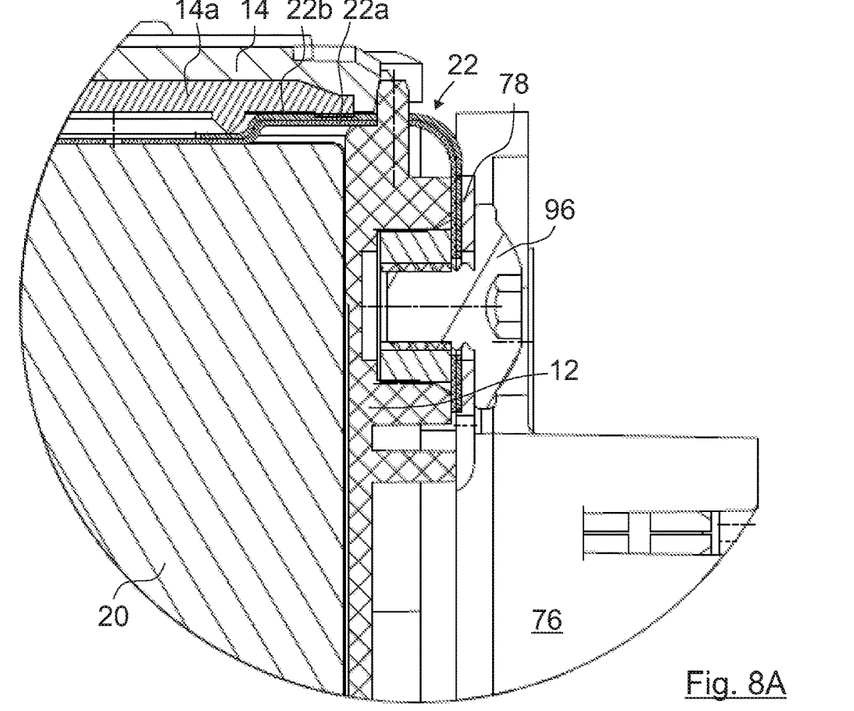
FIG. 8A is a detail view of the battery pack according to the invention corresponding to detail A of FIG. 7.
Figure 8B:
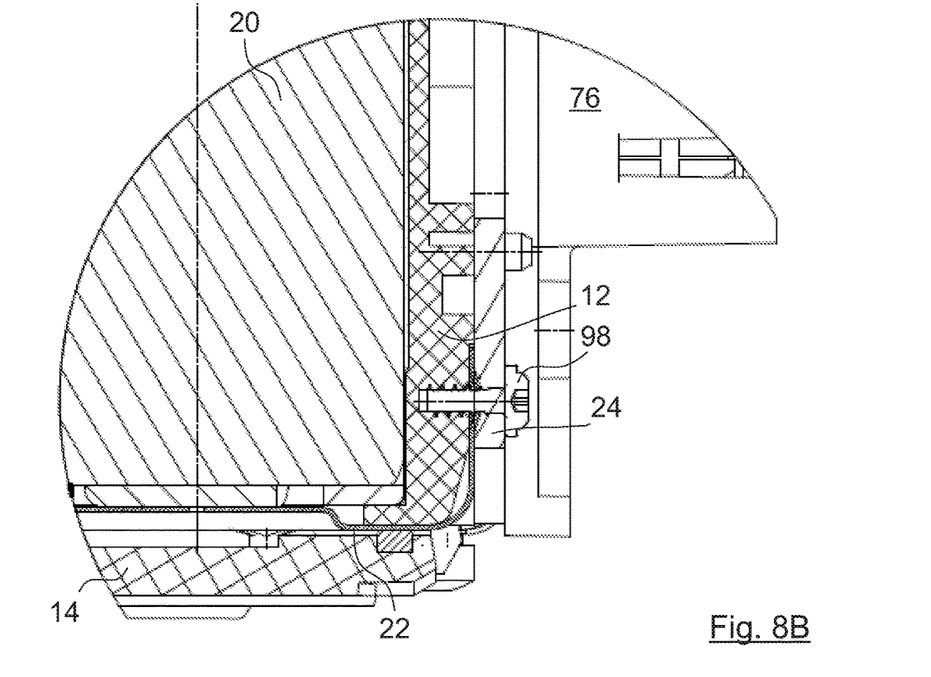
FIG. 8B is a detail view of the battery pack according to the invention corresponding to detail B of FIG. 7.

Finally, a further particularity of the battery pack 10 can be recognized in the particular configuration of one or more conductor plates 22, such as the conductor plates at the positive and negative poles of the battery cell series connection. Contrary to the prior art, two conductor plates 22a and 22b are applied here, namely a first conductor plate 22a and a second conductor plate 22b, which at least partly overlap with each other (cf. FIGS. 7 and 8A). For example, the first conductor plate 22a, as a single conductor plate for connecting to the battery cells 20, is welded only to the upper battery cell 20, and the second conductor plate 22b, as a double conductor plate for connecting to the battery cells 20 (overlapping with the single conductor plate 22a in the vicinity of the upper battery cell 20), is welded only to the lower battery cell 20.

An increase in the current carrying capacity compared to the solutions known from the prior art is achieved in this way.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A rechargeable battery pack (10), in particular for a hand-held electrical power tool, comprising: at least one rechargeable battery cell (20) and/or one rechargeable battery cell block, a housing for receiving the at least one rechargeable battery cell (20) and/or the at least one rechargeable battery cell block, and
    a printed circuit board (24) that can be connected to the at least one rechargeable battery cell (20) as well as electronic components,
    wherein the housing has ventilation recesses (18a, 18b), by means of which cooling air from an outside environment can reach an interior of the housing interior and can be dissipated back into the outside environment,
    wherein a structure for conducting air and separating pole areas of the battery cells (20) can be provided in the interior of the housing, wherein the battery pack (10) further has an electronics cup (76) that can accommodate at least some of the electronic components of the printer circuit board (24), the electronics cup (76) configured to provide airflow and separate the pole areas of the battery cells (20), and wherein the electronics cup (76) has, on a surface facing away from the electronic components it is accommodating, at least one air-conducting element comprising a partition (74) for providing airflow and separating the pole areas of the battery cells (20),
    wherein the housing comprises at least one housing part (14,16), in particular a housing cover (16) configured to be detachable from a rest of the housing, and wherein said housing cover (16) has on an inner surface at least one air-conducting partition (72) that is adapted to interact with the partition (74) on the electronics cup (76) and form a partition wall within the rechargeable battery pack (10).

2. The battery pack according to claim 1, wherein the electronics cup (76) is produced, and in particular is cast, from a synthetic material in order to protect the electronic components accommodated therein from contamination.

3. The battery pack (10) according to claim 1,
    wherein said housing cover (16) has on the inner surface at least another air-conducting element, in particular the at least one air-conducting partition (72), that provides airflow and separates the pole areas of the battery cells (20).

4. The battery pack (10) according to claim 3,
    wherein the housing part (14, 16) that can be detached from the rest of the housing, in particular two laterally arranged side covers (14), also has, at least on its inner side, an injection-molded rubber component (14a) for an improved sealing of adjacent components of the battery pack (10), in particular the pole areas.

5. The battery pack (10) according to claim 1,
    wherein the housing has a cell carrier (12) for mounting of the at least one battery cell (20) in the interior of the housing.

6. The battery pack (10) according to claim 3,
    wherein the at least one detachable housing part (14, 16), in particular the housing cover (16) and/or at least two side covers (14), can be or are detachably connected to a cell carrier (12).

7. The battery pack (10) according to claim 6,
    wherein the detachable housing part (14, 16) can be placed on the cell carrier (12) and has, for example, the ventilation recesses (18a, 18b) and/or a structure for detachably connecting to a hand-held electrical power tool and/or has contact elements for electrically connecting to a hand-held electrical power tool or to a battery charger.

8. A hand-held electrical power tool with an electric motor and at least one rechargeable battery pack (10) according to claim 1 that can be detachably connected thereto, wherein at least one interface is provided for mechanically and electrically connecting the battery pack (10) to the hand-held electrical power tool.

* * * * *